Figure 1:
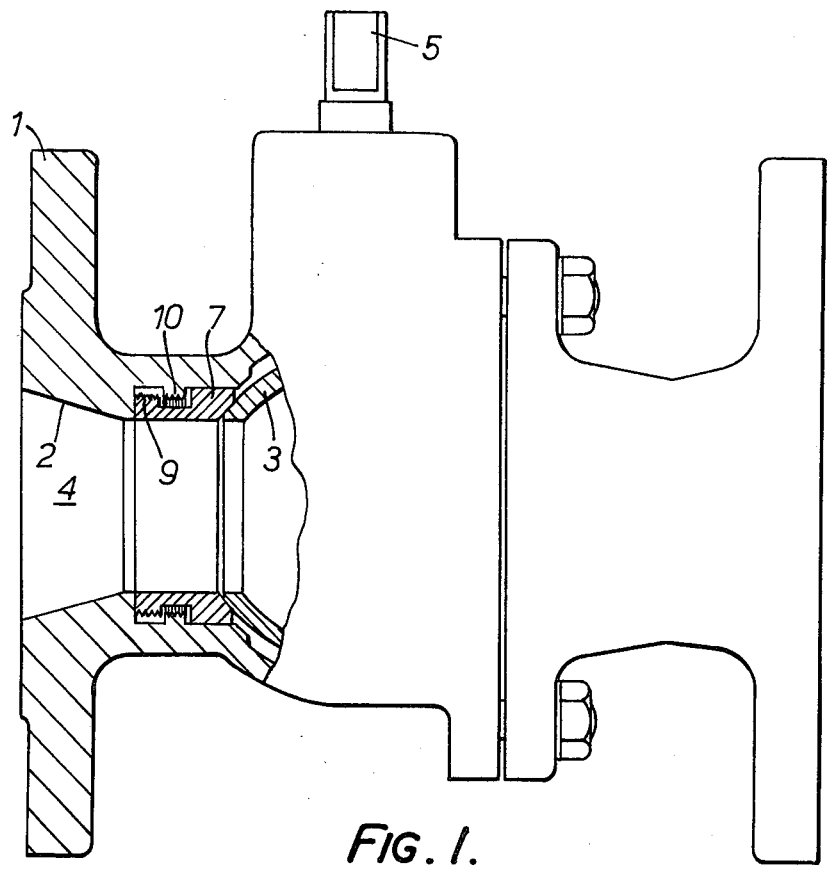

United States Patent [19]
Pugh

[11] 3,930,636
[45] Jan. 6, 1976

[54] BALL VALVES

[75] Inventor: David Edward Pugh, Much Cowarne, England

[73] Assignee: Saunders Valve Company Limited, Wales

[22] Filed: Nov. 11, 1974

[21] Appl. No.: 522,540

[30] Foreign Application Priority Data
Dec. 20, 1973  United Kingdom............... 59201/73

[52] U.S. Cl. ............... 251/315; 251/360; 251/174; 251/316; 251/317; 137/329.01
[51] Int. Cl.² ........................................... F16K 5/06
[58] Field of Search .......... 251/174, 185, 315, 316, 251/317, 360; 137/329.01

[56] References Cited
UNITED STATES PATENTS
| | | | |
|---|---|---|---|
| 2,890,017 | 6/1959 | Shafer | 251/317 |
| 3,208,470 | 9/1965 | Lidgard | 251/315 |
| 3,378,026 | 4/1968 | Oliver | 251/174 |

*Primary Examiner*—William R. Cline
*Assistant Examiner*—H. Jay Spiegel
*Attorney, Agent, or Firm*—Scrivener Parker Scrivener and Clarke

[57] ABSTRACT

A ball valve having a seating ring held in a recess in the valve bore by threaded portions of the ring and bore such that, when the ring is in position, the threaded portion on it has passed right through the threaded portion of the bore, there being a radial expansion gap between part of the ring and the recess.

8 Claims, 2 Drawing Figures

U.S. Patent  Jan. 6, 1976  3,930,636

BALL VALVES

The present invention relates to improvements in ball valves.

In a conventional ball valve the ball seats against an end face of a seating ring which is located in a recess in the valve housing bore with its other end face and entire outer periphery abutting fixed surfaces. The seating ring is often made from a plastics material, for example, polytetrafluoroethylene, and when the valve is subjected to high operating pressure differentials there is a danger that, as the valve is moved from the closed or open position, the seat may be extruded due to the high velocities of flow at the point when the valve is just opening or just closing.

Also, when the valve is subject to high temperatures, the valve seating ring tends to expand but, being unable to expand radially and axially outwardly, the ring tends to extrude into the gap between the valve bore and the ball. This extrusion is undesirable as it causes high operating torques, damage to the ring and can cause jamming of the ball.

According to one aspect of the present invention there is provided a ball valve comprising a valve housing having a bore therethrough, a ball mounted in the bore having a flow passage therethrough and rotatable to open and close the valve, and a seating ring engaging the ball on one side thereof, the ring being located in a recess in the bore wall, wherein the axially extending surface of the recess and the radially outwardly facing surface of the seating ring are provided with correspondingly threaded portions so arranged that when the seating ring is in position in the recess the threaded portion of the ring has passed through and lies wholly to one side of the threaded portion of the recess, and the recess and seating ring are so dimensioned that, in this position of the ring, there is radial clearance between the threaded portion of the ring and the recess.

In the preferred embodiment, when the ring is positioned in the recess, the end of the ring remote from the ball abuts an end surface of the recess. Preferably, when the ring is positioned in the recess, there is radial clearance between the threaded portion of the recess and the ring and axial clearance between the threaded portion of the ring and the threaded portion of the recess.

A spring which may either be a mechanical spring or an elastomeric spring, may be provided to bias the seating ring towards the ball to compensate for wear or movement of the ball when subject to pressure loading in the closed position.

An embodiment of the invention provides a ball valve in which the seating ring is positively retained and in which a radial clearance exists between part of the seating ring and the recess in which it is located. This clearance defines a space into which the seating ring can extrude when subjected to high temperatures, thereby reducing or preventing the tendency of the seating ring to extrude into the gap between the valve bore and the ball.

According to another aspect of the invention there is provided a seating ring for a ball valve, including a ball engaging face adjacent one end thereof and a radially outwardly facing axially extending surface, said axially extending surface including a first axial region which is remote from said one end and which is externally screw threaded; a second axial region between the first axial region and said one end, the second axial region having a maximum external diameter which is less than the maximum external diameter of the first axial region; and a third axial region between the second axial region and said one end, the third axial region having a maximum external diameter which is greater than the maximum external diameter of the first axial region.

Figure 2:
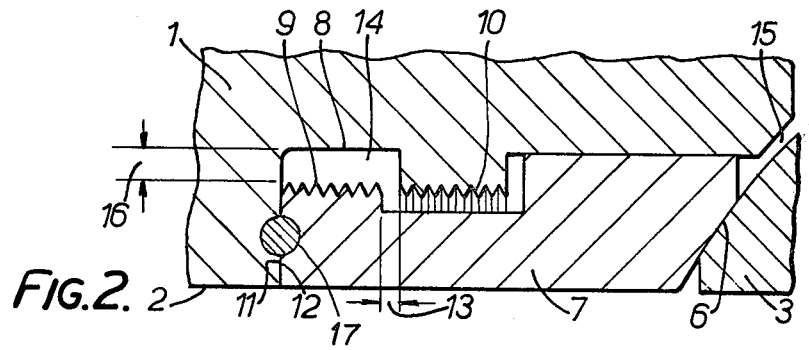

The invention will be better understood from the following description of a preferred embodiment thereof, given by way of example only, reference being had to the accompanying drawing, wherein:

FIG. 1 is a partly broken away elevational view of an embodiment of ball valve in accordance with the present invention; and FIG. 2 is an enlarged view of the encircled part of the valve of FIG. 1.

As shown in the drawing, the ball valve comprises a valve housing 1 having a bore 2 in which a ball 3 is located. The ball has a flow passage 4 therethrough and is rotatable about a vertical axis by a spindle 5 to open and close the valve. At each side of the ball, the ball engages a correspondingly shaped end face 6 of a seating ring 7, which may be made from plastics material, for example polytetrafluoroethylene, and which is located in a recess 8 formed by a counter-bore in the bore 2.

A portion 9 of the radially outwardly facing axially extending surface of the seating ring 7 is threaded, the threading being arranged to co-operate with a threaded portion 10 of the axially extending surface of the recess. The threaded portion 10 of the recess is spaced from the outer end face 11 of the recess and stands proud of the adjacent portions of the recess surface. In installing the seating ring 7 in the valve housing, the threaded portion 9 is threaded into and through the recess threaded portion 10 until it is clear of it and lies wholly outwardly of it.

The dimensions of recess and seating ring are arranged so that, in the installed position of the seating ring with the outer end face 12 of the seating ring abutting the end face 11 of the recess, there is radial clearance 16 between the threaded portion 9 of the ring and the recess 8. Radial clearance may also be provided between the threaded portion 10 of the recess and the seating ring. The radial clearance between the seating ring and the recess defines a space 14 into which the seating ring may expand when it is compressed due to, for example, thermal expansion of the valve. The provision of the space 14 tends to reduce or prevent extrusion of plastics seating rings into the gap 15 between the ball 3 and the housing 1.

Additionally, the threaded portions 9, 10 may be so dimensioned and arranged that there is axial clearance 13 therebetween. This axial clearance is such as to allow relative movement between the ring and recess without engagement of the threaded portions 9, 10. The axial clearance 13 also provides space into which the seating ring 7 can expand without extrusion when the valve is subject to high temperatures.

To ensure sealing of the seating ring with the housing, an O-ring 17 may be provided between the abutting end faces 11, 12 of the recess and seating ring. This O-ring may also serve as an elastomeric spring biasing the seating ring towards the ball. Alternatively or additionally a mechanical spring may be provided to bias the seating ring towards the ball.

In the above described embodiment of a ball valve the seating rings are positively retained in the bore and will not fall out if the ball is demounted. Further, each seating ring is so arranged in the bore that there is space for it to expand without extrusion when the valve is subject to high temperatures.

What is claimed is:
1. A ball valve comprising:
   a. a valve housing have a bore therethrough;
   b. a ball rotatably mounted in the bore, the ball having a flow passage therethrough and being rotatable to open and close the valve;
   c. a recess in the wall of the bore, said recess having an axially extending surface portion; and
   d. a seating ring located in the recess, the seating ring being in engagement with the ball on one side thereof and having a radially outward facing surface, the axially extending surface portion of the recess and the radially outwardly facing surface of the seating ring being provided with correspondingly threaded portions so arranged that when the seating ring is in position in the recess the threaded portion of the ring has passed through and lies wholly to one side of the threaded portion of the recess, and the recess and seating ring being so dimensioned that, in this position of the ring, there is radial clearance between the threaded portion of the ring and the recess.

2. A ball valve according to claim 1, wherein, when the ring is positioned in the recess, there is radial clearance between the threaded portion of the recess and the ring.

3. A ball valve according to claim 1 wherein, when the ring is in position in the recess, there is axial clearance between the threaded portion of the ring and the threaded portion of the recess.

4. A ball valve according to claim 1 wherein a spring is provided to bias the seating ring towards the ball.

5. A ball valve according to claim 4, wherein said spring is an elastomeric spring.

6. A ball valve according to claim 5, wherein said elastomeric spring comprises an O-ring seal located between the end of the seating ring remote from the ball and a wall of the recess.

7. A ball valve according to claim 1 wherein the sealing ring is made from a plastics material.

8. A ball valve according to claim 7, wherein the plastics material is polytetrafluoroethylene.

* * * * *